United States Patent
Seeberger

(10) Patent No.: US 6,240,618 B1
(45) Date of Patent: Jun. 5, 2001

(54) PROCESS FOR MANUFACTURING A PREFABRICATED VEHICLE DOOR MODULE

(75) Inventor: Jürgen Seeberger, Baunach (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/202,512

(22) PCT Filed: Jun. 26, 1997

(86) PCT No.: PCT/DE97/01364

§ 371 Date: Dec. 15, 1998

§ 102(e) Date: Dec. 15, 1998

(87) PCT Pub. No.: WO98/00329

PCT Pub. Date: Jan. 8, 1998

(30) Foreign Application Priority Data

Jun. 28, 1996 (DE) ............................................. 196 25 974

(51) Int. Cl.[7] ............................. B23P 23/00; B23Q 41/00
(52) U.S. Cl. ............................. 29/564; 29/564.1; 29/857; 29/860; 29/430; 29/771; 29/783; 29/784; 29/787; 29/791; 29/795
(58) Field of Search .................................. 29/564, 564.1, 29/857, 33 M, 860, 430, 771, 783, 784, 786, 787, 791, 793, 795; 174/72 A, 117 FF, 250

(56) References Cited

U.S. PATENT DOCUMENTS

| | | | |
|---|---|---|---|
| 3,686,752 | * | 8/1972 | Hammond ............................. 29/430 |
| 4,030,174 | * | 6/1977 | Buttner et al. ....................... 29/430 |
| 4,553,309 | * | 11/1985 | Hess et al. ............................ 29/791 |
| 4,824,164 | | 4/1989 | Nakayama et al. .................. 296/146 |
| 4,848,829 | | 7/1989 | Kidd ..................................... 296/152 |
| 4,882,842 | | 11/1989 | Basson et al. ......................... 29/857 |
| 4,943,109 | | 7/1990 | Skrbina et al. ..................... 296/146 |
| 5,095,659 | | 3/1992 | Benoit et al. .......................... 49/502 |
| 5,610,454 | * | 3/1997 | Nishikawa et al. ................ 174/72 A |
| 5,743,010 | * | 4/1998 | Zaguskin et al. ..................... 29/857 |

FOREIGN PATENT DOCUMENTS

| | | |
|---|---|---|
| 3738720 | 5/1989 | (DE) . |
| 361197151 | * 9/1986 | (JP) ....................................... 29/564 |

* cited by examiner

Primary Examiner—Gregory L. Huson
Assistant Examiner—Rick Kiltae Chang
(74) Attorney, Agent, or Firm—Christie, Parker & Hale, LLP

(57) ABSTRACT

The invention relates to a method for the manufacture of a prefabricated motor vehicle door module and is directed to improving the manufacturing efficiency of complex technical systems with extensive cabling. The method for manufacturing the prefabricated motor vehicle door module with an electronics unit and several electrical components, such as a window regulator motor, central locking, mirror adjustment and heating, switches, lights, speakers, and a side bag, comprises fitting out of a support plate with the electrical components provided for a specific vehicle door and the cabling of the door by means of electrical leads; wherein the fitting out step is carried out in a main assembly line; wherein at least a part of the electrical leads is prefabricated as individual lead connections in a secondary cable production line in accurate sequence for the door module production in a production device and are mounted independently of each other directly on the door module in a main assembly line.

10 Claims, 5 Drawing Sheets

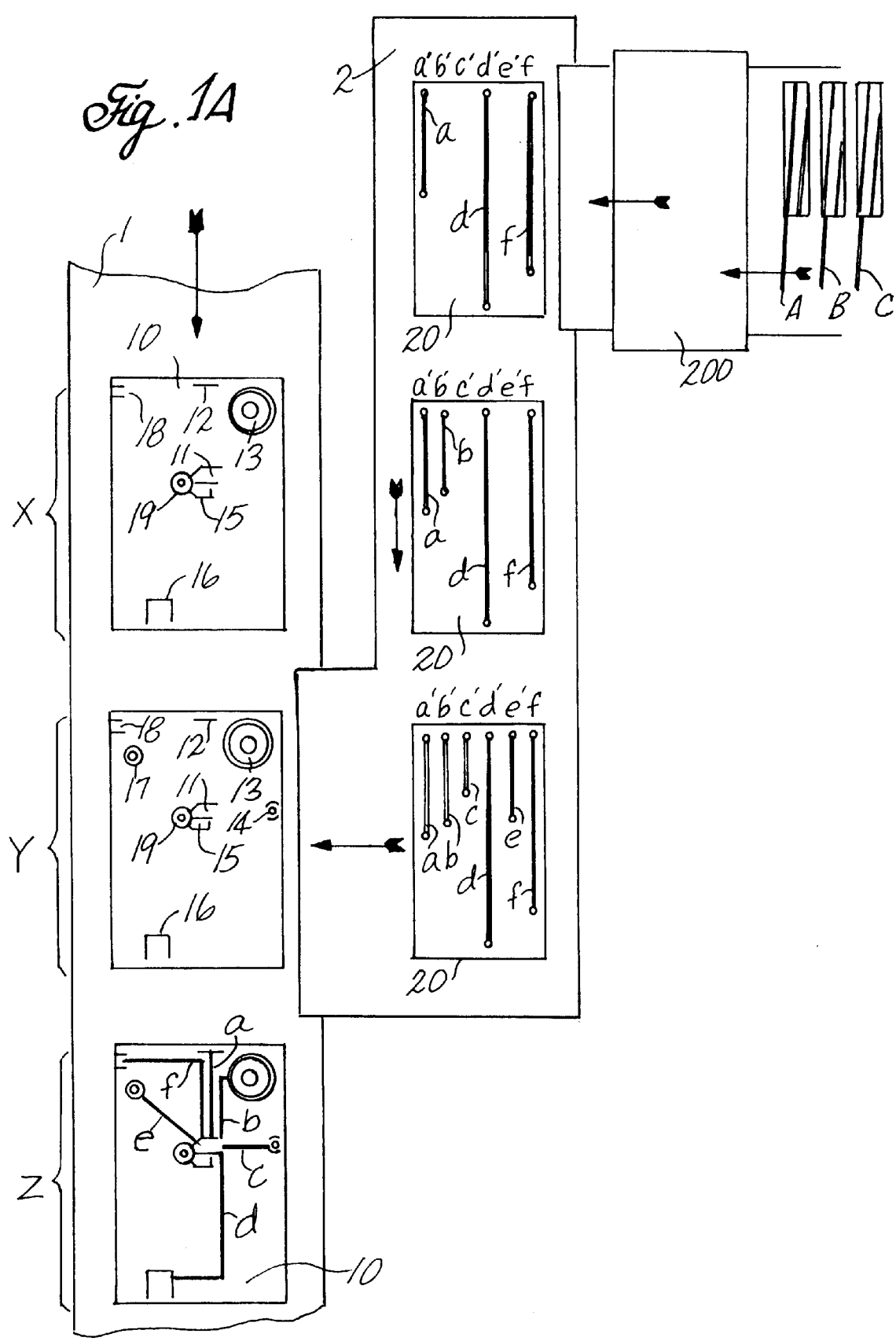

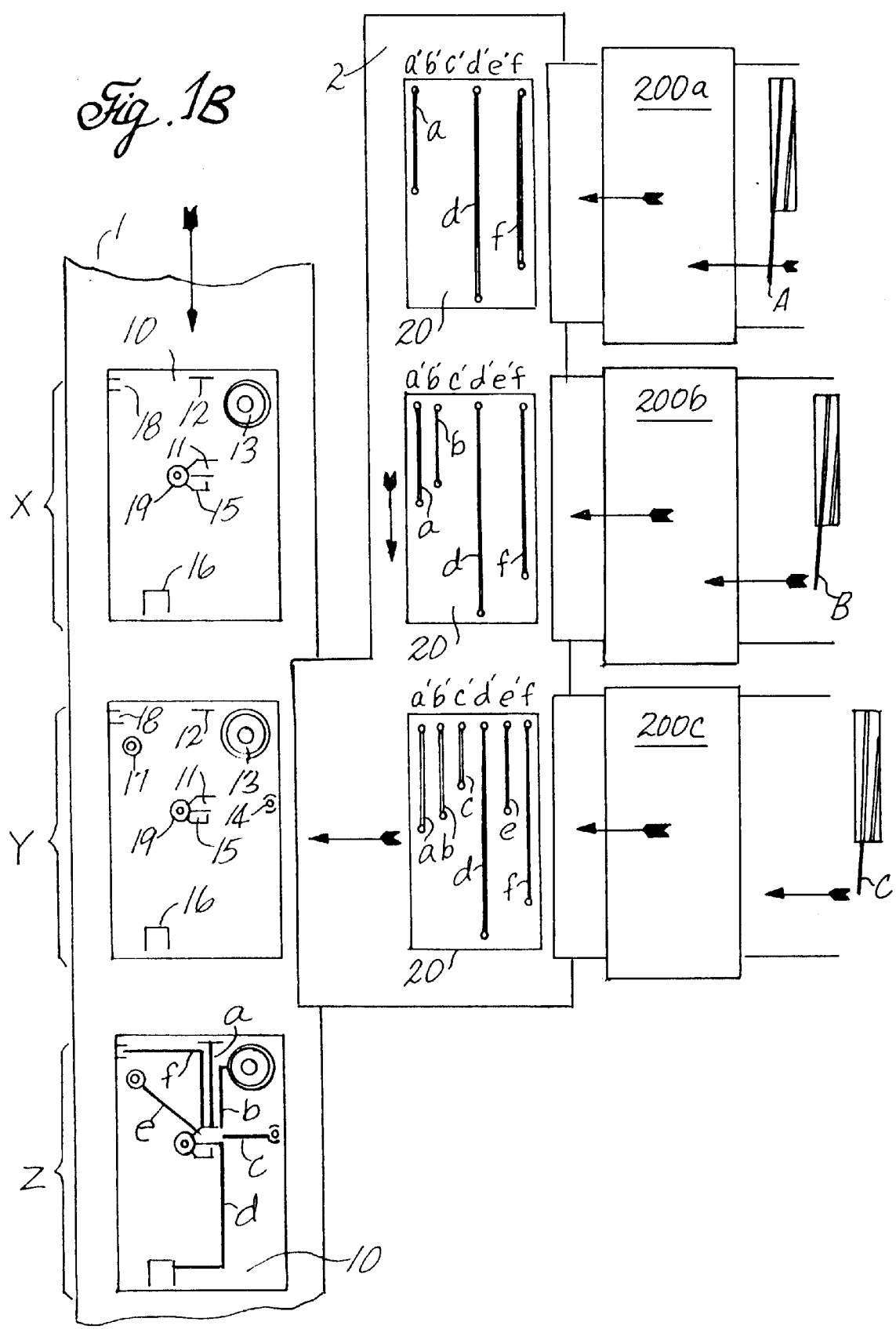

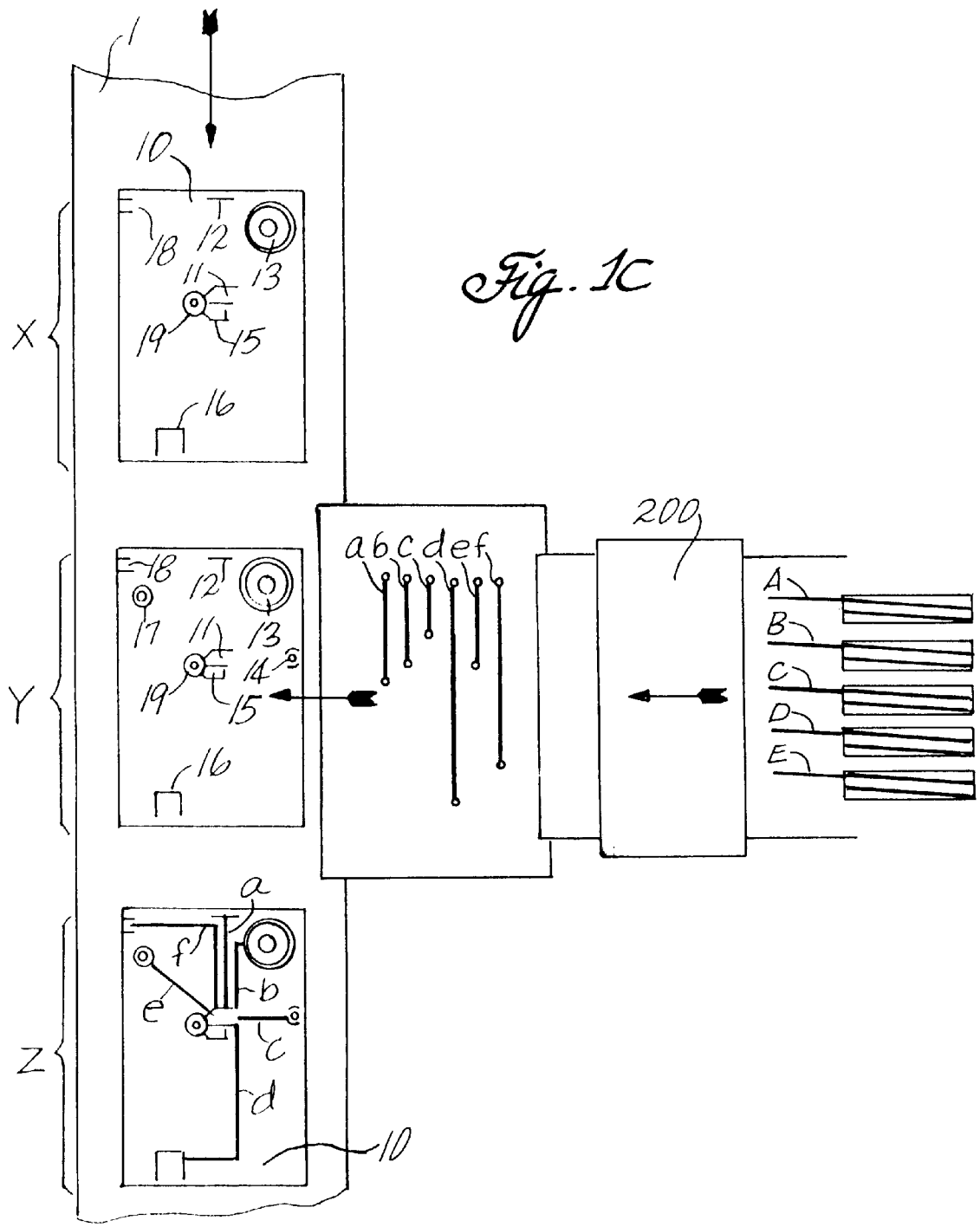

PROCESS FOR MANUFACTURING A PREFABRICATED VEHICLE DOOR MODULE

FIELD OF THE INVENTION

The invention relates to a method for manufacturing a prefabricated motor vehicle door module.

BACKGROUND OF THE INVENTION

From U.S. Pat. No. 4,882,842, a modular construction vehicle door and method for manufacturing the door are known. An assembly plate is provided for holding mechanical and/or electrical components. The fitting out of the assembly plate takes place in a preassembly line before it is supplied to the main assembly line of the vehicle for installation into the door.

The support plate is to consist of at least one layer made by injection moulding and is to support a drive for a window regulator mechanism. Furthermore, the support plate can also have a locking mechanism, an electronics module, and switch and electric cable which are associated with indentations, guides or positioning walls.

From U.S. Pat. No. 4,943,109, a modular construction motor vehicle door is known having a support plate wherein a cable tree is mounted on the support plate with electrical connectors which are associated with appropriate electrical plug connections on a rigid door body. These plug connections are connected to a number of electrical components which are fixed on the door body. When mounting the support plate on the frame structure of the door there is an engagement between the opposing plug elements, wherein the plug connectors of the support plate can execute a lateral relative movement in order to produce tolerance compensation.

SUMMARY OF THE INVENTION

The object of the invention is to make the manufacture of prefabricated door modules for motor vehicle doors fitted with several electrical components more effective and thus to lower production costs.

The electrical leads or cables required for fitting out the relevant door module are ready made in precise sequence in a cable production line at the side of the main assembly line. These cables are supplied to the relevant door module preferably in sets and then installed. An electronic data processing unit controls the main assembly line of the door modules and the cable production line. The accurate matching of the cable production to the requirements of the door module variations from the point of view of timing and sequence is absolutely essential for a successful execution of the process.

With such a procedure, it is possible to provide the electrical leads as individual connections between the electrical components which are to be connected. In the present invention, the electrical leads are not combined into complex cable trees, as is usual. By replacing the cable trees with prefabricated individual connections, it is possible to save expensive manual work and material. In particular, the bands will no longer be needed for wrapping round the lead wires.

The production of the electric leads and cables required comprises basically the following steps: first at the start of the cable production line, the types of cable which have been previously fixed are prepared. For example, the cables are sorted out according to the cross-section of the lead, the number of wires and the color. The cable ends are supplied to an automatic production machine which diverts the lead pieces required and prepares the lead ends for contacting the door module support. This means that the lead ends are coated with tin, compacted or provided with a plug connection depending on the type of contacting chosen, for example soldering, ultrasonic welding or push-fit connection.

Preparing the cable, thus produced for assembly on the main assembly line of the door module, can be carried out according to a variation of the invention immediately from the cable production device whereby the cable production line can be kept very short. If an automatic assembly machine is to undertake the laying and contacting of the cable on the door module support, then the transfer of cable from the production device must ensure that the automatic assembly machine always grips the cables which are appropriate for the electrical components. To this end, for example, the ready-made cables can be laid down on a pre-holding tray divided into sectors whereby each cable is associated with a certain sector. If, moreover, the cable ends are fixed in predetermined positions, then this ensures problem-free access by the automatic assembly machine.

Naturally, the method according to the invention can also be carried out in two parallel production lines wherein the fitting out of the door module with the individual function systems, more particularly with the electrical components, and the cable production, run parallel until a fully equipped door module and a complete cable set are available and can be brought together.

Deciding on which selected method variation is to be used requires consideration of the entire conception of the unit. Special significance must be attached to the slowest method step. In the event that, for example, the performance capacity of the cable production and the cable assembly is twice as great as the performance capacity of preparing door modules with prefitted components, then the cable production line could serve two parallel main assembly lines.

The contacting of the cable ends with the associated electrical components is preferably carried out from a uniform assembly direction running substantially at right angles to the plane of the support plate. The contact spots of the electrical components are prepared accordingly. A door electronics unit which can be integrated in the drive unit for an electrical window regulator preferably serves the central supply of the electrical components with energy and, where applicable, with signals. The electronics unit itself is supplied from a main cable wire to whose main plug connection the dashboard network of the vehicle can be connected. When designing the main cable wire using multiplex technology it is possible to significantly reduce the number of leads. Although the use of several different production techniques, for example soldering, ultrasound welding and plug connection, increases the cost of production compared with the use of only one single contacting technique, this can nevertheless be of advantage when taking into account other aspects, such as for example service friendly maintenance. Thus the following concepts can also be considered:

a) The contacting of the cable with the electrical components is carried out by a cost-effective connection technique which itself cannot be released, such as soldering, whilst the other lead ends are attached to the electronics unit by means of push-fit plug connections. In the event of a failure of one of the electrical components this could be exchanged with the cable.

b) In the reverse case, where all the cables are soldered to the electronics unit and the cable ends associated with the electrical components are provided with plug connections, the cable remains when replacing one of the electrical components. However, with a failure of the electronics unit, all the cables would be lost.

c) Starting from variation b), it is also possible to replace the solder connections on the electronics unit by connections with a cut/clamp technique. This ensures that the electrical connections are protected from moisture.

BRIEF DESCRIPTION OF THE DRAWINGS

The invention will now be explained in further detail with reference to the embodiments and the drawings illustrated in which:

FIG. 1A is a diagrammatic illustration of the production sequence of a door module with a cable production device which processes several types of cable;

FIG. 1B is a diagrammatic illustration of the production sequence of a door module with three cable production devices, each processing only one type of cable;

FIG. 1C is a diagrammatic illustration of the production sequence of a door module with only one production device which provides the required cable immediately prior to its assembly on the door module;

DETAILED DESCRIPTION OF THE PREFERRED EMBODIMENT

Figure 2:
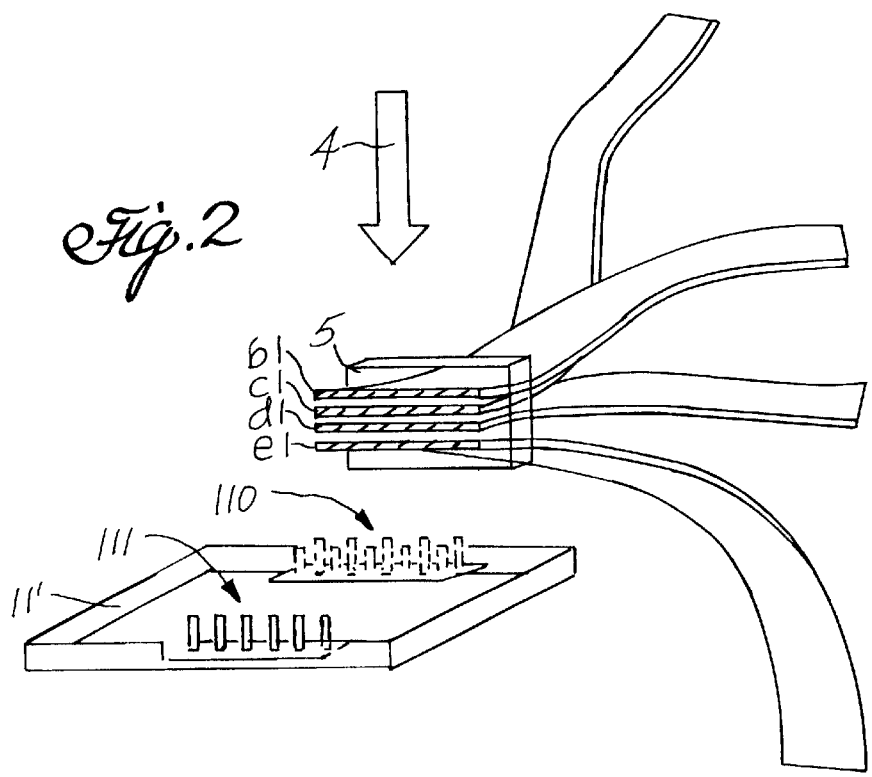
FIG. 2 is a diagrammatic illustration of a cutting/clamping connection with four cable ends combined into one holder element for connection with an electronics unit.

The trend to modular technology in vehicle construction has led to a sharp reduction in the number of units to be installed in the automobile factory. To the same extent, however, these units have become more complex and in part extremely varied in design. This development particularly shapes the construction of modern door designs. Thus a vehicle door can nowadays consist substantially of the door body, a door module with a number of functional units (window regulator, lock, electronic control device, loudspeaker etc) and the inner door trim, if one disregards the window pane and outside door mirror.

As a result of the number of components to be prefitted on the door module and the different consumer choices for the customer, a large number of door module variations is produced through the various combinations. The same applies to the number of variations of the cable trees which one tries to reduce by offering custom-fitting packages. Deviations from the custom-fitting packages generally leads to one or more leads of the cable tree remaining unused. Cabling the electrical components makes up a comparatively large proportion of the total costs of the door module.

The present invention provides the prerequisite for a more efficient production of door modules with a larger choice of variations and, at the same time, economic use of materials. The largest part of the electrical leads are ready made in a cable production line mounted at the side of the main assembly line of the door modules and are fitted in the shortest possible way.

The embodiments described below can only indicate some of the possible variations of the principle of the invention. Details regarding cable production and cable contacting with the associated contact points of the electrical component which are known to the technical expert will not be described in further detail.

According to FIG. 1A, a main assembly line 1 is provided in which is carried out the fitting of a metal or plastic support plate 10 with the electrical components 12 to 18. A cable production line 2 works parallel to this and provides, in accurate sequence with the door module production, the required electrical leads a to f to the main assembly line.

At the start of the cable production line 2, there is access to the types of cable A,B,C which are provided on cable drums or the like and which can be different for example with regard to material, cross-section of leads, color and the like. A production device 200 is provided in the cable production line 2 wherein the device 200 processes cables A, B, C. After cutting to length in the production device, the lead ends are prepared for contacting with the electronics unit 11 or one of the electrical components 12 to 18. To this end, each cable end is, according to the proposed type of contacting (for example soldering, ultrasonic welding, push fit connection), either coated with tin, compacted or provided with plug connectors. The electrical leads a to f which are thus prepared for assembly are laid down on a cable tray 20 namely so that each special electrical lead a to f is associated with the appropriate gap-like sector a' to f' so that a systematic assembly (by hand or automatically) can be guaranteed. The lead ends, to be prepared, are preferably held exactly at previously determined positions in order to allow simple access for an automatic assembly machine.

The control of the cable production line 2 is carried out preferably by the same electronic data processing unit which controls the door module manufacture of the main assembly line. In the end, the required product data of the two production lines 1, 2 must conform exactly with each other with regard to quantity, design and assembly time point. According to the embodiment of FIG. 1A described, the beat frequency of the preparation of a cable set agrees with the beat frequency of the door module production. That is, the cable set diagrammatically shown in the plane X, consisting of the electrical leads a,b,d,f is designated for the door module 10 of the same plane X in order to connect the electrical components (woofer 13, central locking 16 and wing mirror 18) to the electronics unit 11. The electrical lead a produces the connection (preferably in the multi-plexing technique) between the electronics unit and a main plug connector 12 which connects the door to an energy source and a central dash board electronics system.

The door module 10 and the cable tray 20 of plane Y have a higher fitting out degree. In addition, a floor light 14 and treble toner 17 are provided which are attached to the electronics unit by means of the electrical leads c and e. The plane Z shows at the end of the door module production a completely pre-assembled door module whose degree of fitting out corresponds to that of plane Y.

The embodiment of FIG. 1B substantially differs from that previously described, in that three production devices 200a, 200b, 200c are provided in the cable production line 2, wherein each one only processes one type of cable A,B,C. The device 200a produces the electrical leads a, d, f from the cable type A. The device 200b produces the electrical lead b from cable B. The device 200c in the plane Y produces the electrical leads c and e from cable C. A variation of technical equipment of this kind then appears to be advantageous if the cable types A,B,C differ very severely from each other, for example round cables and flat band cables and/or the preparation of the cable ends is of different technology (soldering and push-fit connection) and/or the output of only one production device 200 cannot cover the needs of the main assembly line 1.

The third embodiment (see FIG. 1C) differs from that of FIG. 1A in that the production device 200 does not place the finished electrical leads a to f onto a cable tray 20 but supplies these straightaway to the main assembly line 1. Preferably an automatic assembling machine (not shown) is integrated in the production device 200 and connects the electrical leads a to f to the electrical components 11 to 18 immediately after their production. The device 200 processes five different types of cable A to E. An apparatus structure of this kind can advantageously be used when the assembly time for an electrical lead a to f coincides roughly with the time required for the production of the next electrical lead.

Figure 3:
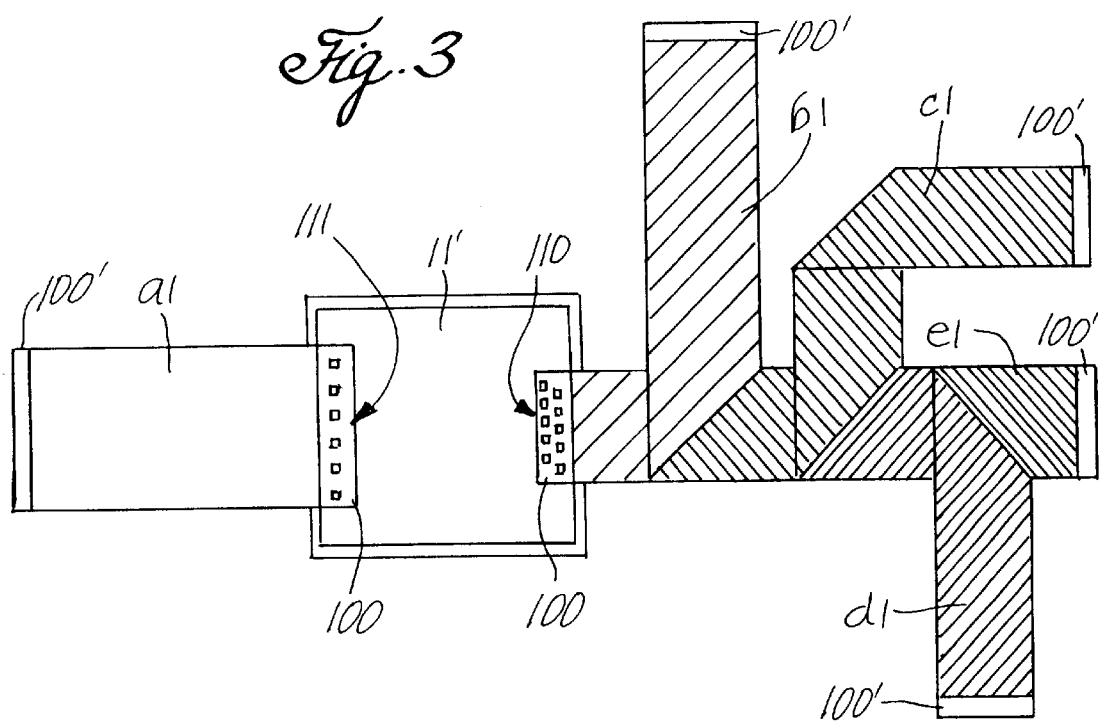
FIG. 3 is a diagrammatic illustration of the plan view of FIG. 2, but with an additional attached main cable.

With FIGS. 2 and 3 it should be pointed out that when using the cutting/clamping technique, the electronics unit 11' can contact a contact point (cutting contacts 110) with several lead ends 100. For this purpose, the leads b1 to e1 are pressed either one after the other or combined by a holder element 5 in the assembly direction 4 across the plane of the support plate 10 into the area of the cutting contacts 110. A prerequisite for this use of multi-layer technology is obviously the agreement between the position of the individual leads b1 to e1 as well as of the individual cutting contacts 110. As holding element 5 can be used as a clip-on, clamp-like part which fixes the lead ends relative to each other, injection moulded plastics can also be used.

From FIG. 3 it can be seen that the other cutting contacts 111 contact the lead end 100 of the main cable a1 which is to be attached with the lead end 100' to the main plug connector 12 (see FIG. 1A). The lead ends 100' of the leads b1 to d1 are attached to the electrical components 13, 14, 16, 18. (See FIG. 1A).

Figure 4:
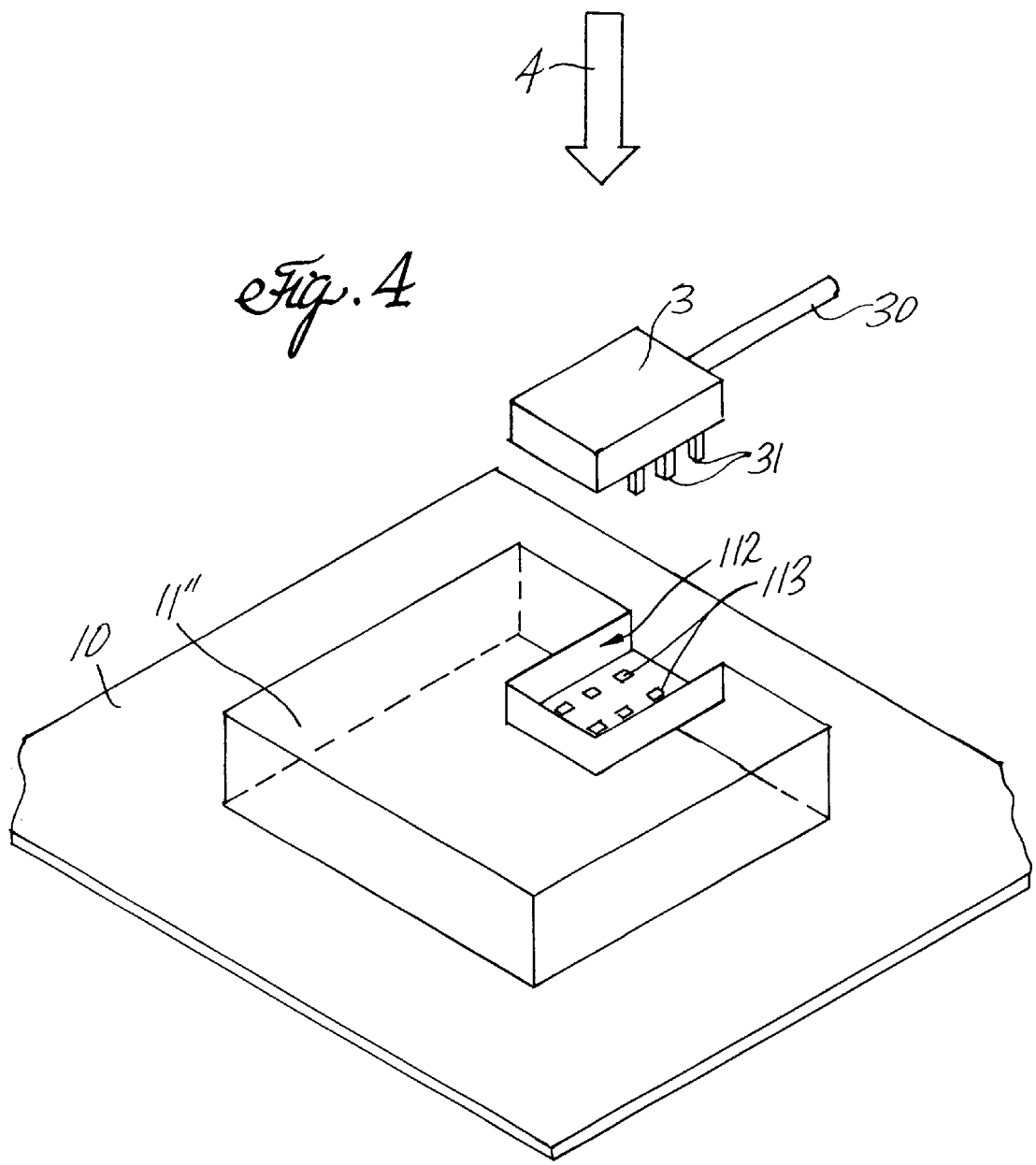
FIG. 4 is a diagrammatic illustration of the alignment of the contact elements of a plug connection relative to the support plate of the door module.

The illustration of FIG. 4 shows diagrammatically sections of a support plate 10 and an electronics unit 11" with a plug coupling 112 for holding the plug 3 which is connected to a cable 30. The arrow 4 shows once again the assembly direction which is substantially orthogonal to the plane of the support plate 10 and is to run uniform for all contacting points in order to avoid complicated assembly processes and the problems and costs associated therewith. The plug contacts 31, 113 can naturally also be interchanged between the electronics unit 11" and in the plug 3.

In order to be able to guarantee a low error quota, each door module which leaves the production should be subjected in a test device to a function test for all the components. This also applies to those components (such as for example: the wing mirror) which are still not yet connected to the electronic control unit. At this point an electrical measuring instrument can also enter into the test device.

The function test comprises attaching the lead ends which are still free and have not yet been connected to the electrical components (e.g. the electrically adjustable and heated outside mirror) to associated test connectors of the testing device, and carrying out a checking process.

What is claimed is:

1. A method for manufacturing a prefabricated motor vehicle door module having a support plate with an electronics unit, electrical components, and electrical leads, the method comprising:

fitting out the support plate with the electrical components provided for a specific vehicle door in a main assembly line;

cabling of the support plate, by means of the electrical leads, in the main assembly line;

prefabricating at least a part of the electrical leads as individual lead connections in a secondary cable production line in accurate sequence for the door module production in a production device; and mounting the electrical leads independently of each other directly on the door module in the main assembly line.

2. The method according to claim 1 further comprising providing the electrical individual lead connections between the electronics unit and associated electrical components;

cutting the electrical leads to length in the cable production line from an endless supply of certain quality cables; and preparing each electrical lead with two ends for contact with the electronics unit and the associated electrical components.

3. The method according to claim 2 wherein preparing the lead ends for contact further comprises using means of at least one of a cutting clamping technique, ultra sound welding technology and soldering technology.

4. The method according to claim 2 further comprising providing the lead ends with electrical plug connections having plug elements that are aligned substantially orthogonal to a plane of the support plate.

5. The method according to claim 2 further comprising attaching one lead end of each electrical lead with a fixed connecting technique to one of the electronics unit and the electrical components, and connecting the other lead end to a detachable plug connection.

6. The method according to claim 2 further comprising contacting the lead ends with a group comprising one of the electronics unit and the associated electrical components by an automatic assembly machine having an assembly direction that runs substantially orthogonal to a plane of the support plate.

7. The method according to claim 2 further comprising combining the lead ends of at least two electrical components associated with the electronics unit in one holder element, and positioning the lead ends before contact is made with a proposed contacting area of the electronics unit.

8. The method according to claim 2 further comprising carrying out a function test, in a test device, after providing the lead connections between the electronics unit and the electrical components.

9. The method according to claim 8 wherein carrying out a function test further comprises attaching the lead ends which are still free and have not yet been connected to the electrical components to associated test connectors of the test device, and carrying out a checking process.

10. The method according to claim 1 further comprising designing a main cable strand of the electronics unit using multiplex technology, and connecting the strand with a vehicle electronics and energy source.

* * * * *